(12) United States Patent
Ashmore et al.

(10) Patent No.: US 9,194,432 B2
(45) Date of Patent: Nov. 24, 2015

(54) TAPERED OIL FEED BEARING CAGE

(71) Applicant: ROLLS-ROYCE PLC, London (GB)

(72) Inventors: Daren Richard Ashmore, Nottingham (GB); James Alan Plant, Nottingham (GB); Graham Paul Morton, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/332,435

(22) Filed: Jul. 16, 2014

(65) Prior Publication Data

US 2015/0043851 A1    Feb. 12, 2015

(30) Foreign Application Priority Data

Aug. 6, 2013 (GB) .................................. 1314050.4

(51) Int. Cl.
| | |
|---|---|
| *F16C 33/38* | (2006.01) |
| *F16C 33/66* | (2006.01) |
| *F16C 33/58* | (2006.01) |
| *F02C 7/06* | (2006.01) |
| *F16C 33/46* | (2006.01) |
| *F16C 19/06* | (2006.01) |

(52) U.S. Cl.
CPC ................. *F16C 33/664* (2013.01); *F02C 7/06* (2013.01); *F16C 33/385* (2013.01); *F16C 33/467* (2013.01); *F16C 33/4676* (2013.01); *F16C 33/586* (2013.01); *F16C 33/6614* (2013.01); *F16C 33/6659* (2013.01); *F16C 33/6677* (2013.01); *F16C 33/6681* (2013.01); *F16C 19/06* (2013.01); *F16C 2360/23* (2013.01)

(58) Field of Classification Search
CPC ............. F16C 33/6677; F16C 33/6681; F16C 33/4676
See application file for complete search history.

(56) References Cited

U.S. PATENT DOCUMENTS 2,838,348 A * 6/1958 Hamm .......................... 384/466
3,179,478 A * 4/1965 Readdy ......................... 384/472
(Continued)

FOREIGN PATENT DOCUMENTS

| EP | 0 202 702 A1 | 11/1986 |
| EP | 2 674 635 A1 | 12/2013 |

(Continued)

OTHER PUBLICATIONS

Search Report issued in British Patent Application No. 1314050.4 dated Feb. 10, 2014.
Mar. 6, 2015 Search Report issued in European Application No. 14 17 6997.

*Primary Examiner* — Thomas R. Hannon
(74) *Attorney, Agent, or Firm* — Oliff PLC

(57) ABSTRACT

A bearing cage for a rolling element bearing assembly includes an outer surface, an inner surface defining a bore, and a plurality of pockets. Each pocket of the plurality of pockets is configured to house a rolling element of the rolling element bearing assembly. The plurality of pockets are arranged sequentially around the bearing cage with respect to an axis of the bore. A guide portion of the inner surface is tapered in an axial direction of the bore such that dimensions of the bore increase towards a central region of the bore, and the bearing cage further includes a plurality of conduits providing fluidic communication between the inner surface of the bearing cage and the outer surface of the bearing cage.

15 Claims, 5 Drawing Sheets

(56) References Cited

U.S. PATENT DOCUMENTS

| | | | | |
|---|---|---|---|---|
| 3,597,031 | A | * | 8/1971 | Bill ............................ 384/470 |
| 4,345,799 | A | * | 8/1982 | Crofts ........................ 384/470 |
| 4,932,500 | A | * | 6/1990 | Smith et al. ................ 384/470 |
| 9,022,661 | B2 | * | 5/2015 | Hayashi ...................... 384/470 |
| 2006/0233476 | A1 | | 10/2006 | Bayer et al. |
| 2009/0214147 | A1 | | 8/2009 | Duong |
| 2013/0087413 | A1 | | 4/2013 | Carter et al. |

FOREIGN PATENT DOCUMENTS

| | | |
|---|---|---|
| JP | 2006-329218 A | 12/2006 |
| JP | 2007-040512 A | 2/2007 |
| WO | 2012/108508 A1 | 8/2012 |

* cited by examiner

TAPERED OIL FEED BEARING CAGE

FIELD OF THE INVENTION

The present invention relates to a bearing cage, in particular a bearing cage suitable for use in a rolling element bearing assembly in a gas turbine engine; for example, a bearing cage suitable for use in a rolling element bearing assembly in a gas turbine engine drive shaft arrangement.

BACKGROUND OF THE INVENTION

The operational life of bearings can be influenced by the method and efficiency of lubrication delivery to the bearing. An oversupply of lubrication can lead to increased churning and heat generation which may lead to premature degradation of the lubricant and failure of the bearing. Conversely, an under supply of lubrication leading to "starved lubrication conditions" can result in increased contact friction, leading to damage and premature bearing failure.

Oil is a typical lubricant used to lubricate bearings. Conventional oil delivery methods to a bearing include greasing, oil mist, oil bath, and oil jet arrangements. The choice of particular method is usually dictated by the operational environment and conditions of the bearing.

Bearings in a typical gas turbine engine drive shaft arrangement have bearings stacked in a vertical arrangement, often relying on the cascading of oil from the upper to the lower part of the system. However, as demands on power transmission and heat dissipation ever increase, more efficient methods of entraining oil to specific locations are required.

FIG. 2 shows an example of a prior art roller bearing 30, with an under race oil feed 32 and an inner piloted cage 34, provided between an outer body 28 and an inner body 29. FIG. 2 provides a cross-sectional view of e.g. an upper portion (only) of a roller bearing assembly, viewed in a vertical plane containing the rotational axis of the cage 34.

The cage 34 provides a pocket for retaining a rolling element 36, such as a roller as in this example or a sphere (e.g. a ball bearing). Rolling element 36 engages with inner raceway 38, provided by inner body 29, and engages with outer raceway 40, provided by outer body 28. A series of pockets are provided by the cage, around the circumference of the cage.

The cage 34 includes a cage inner surface 35, acting as a pilot surface, for cooperating with the outer surface 29a, of inner body 29, acting as a cooperating pilot surface. The respective pilot surfaces 35 and 29a cooperate to maintain the cage 34 in coaxial arrangement with the inner body 29 (and thus also the outer body 28 by virtue of rolling bearing elements 36). There is typically a significant clearance between outer surface 35' of cage 34 and inner surface 28a of the outer body 28. In other words, in a typical inner piloted cage, surfaces 35' and 28a do not cooperate.

To prevent failure of the bearing 30, the rolling element 36 and the pilot surfaces 35 and 29a require suitable lubrication, as discussed above.

In the particular example shown in FIG. 2, the under race oil feed 32 is typically directed to the roiling element 36 of the bearing by the cage (particularly, via the pilot interface generated between the cooperating pilot surfaces 35 and 29a) and the action of gravity. Additionally, or alternatively, cage wings can be provided, which extend from the cage in the axial direction, and which form weir members to promote a feed of oil towards the rolling elements instead of away from them.

However, the architecture surrounding the bearing is not always suitable to permit the use of an inner piloted cage due to the space constraints and assembly considerations. This may be especially true in a gas turbine engine, where the surrounding architecture is particularly complex.

So, in alternative arrangements, an outer piloted cage may be provided. An outer piloted cage is dissimilar to the inner piloted cage shown in FIG. 2 in that a significant clearance is typically provided between the inner surface 35 of the cage 34 and the outer surface 29a of inner body 29. Instead, outer surface 35' of cage 34 provides the pilot surface of the cage, and inner surface 28a of the outer body 28 provides the cooperating pilot surface, whereby cooperation between the pilot surfaces 28a and 35' maintain the cage in coaxial arrangement with the outer body 28 (and thus the inner body 29 by virtue of rolling bearing elements 36).

To prevent failure of the bearing 30, the rolling element 36 and the pilot surfaces 35' and 28a require suitable lubrication. However, an outer piloted cage bearing assembly increases the clearance (distance) between the lubricant (oil) feed supplied by the inner body 29 (the under race oil feed 32) and the cage inner surface 35.

Thus, contrary to the inner piloted cage arrangement, which has a tight clearance between the cage and the inner body to control directly the flow of oil (lubricant) to the working contacts of the bearing 30, the increased clearance associated with an outer piloted cage arrangement leads to a greater dispersal of oil (lubricant) before and after it comes in to contact with the cage.

These factors reduce the overall lubricant "catch efficiency" of the cage. In other words, they can led to a reduction in the effective amount of oil (lubricant) which is directed towards the working contacts of the bearing 30 (such as the rolling elements and/or the pilot surfaces) when compared with an inner piloted cage arrangement. As discussed above, this can lead to catastrophic failure of the bearing.

Additionally, increasing level of oil in the system to compensate for the relative reduction in oil (lubricant) delivery to the bearing 30, can compromise the oil (lubricant) delivery to other features in the arrangement and may reduce the performance and reliability of the overall arrangement.

SUMMARY OF THE INVENTION

The present invention has been made in view of at least these problems. The present invention aims to provide efficient and stable lubrication to a bearing, e.g. in a gas turbine engine. Accordingly, in a preferred aspect, the present invention provides a bearing cage for a rolling element bearing assembly, the bearing cage including an outer surface; an inner surface defining a bore; a plurality of pockets, each pocket being suitable for housing a rolling element of the rolling element bearing assembly, the pockets being arranged sequentially around the bearing cage; characterized in that a guide portion of the inner surface is tapered in the axial direction of the bore such that the dimensions of the bore increase towards a central region of the bore.

Thus, lubricant is encouraged to flow towards the pockets, and therefore towards the working contacts of the bearing assembly in which the bearing cage is incorporated in use.

The outer surface, in the radial direction, of the bearing cage is preferably suitable for use as the pilot surface of the bearing cage; the bearing cage therefore being an outer piloted bearing cage. Thus, lubricant caught by the inner surface of the bearing cage is guided by the tapered bore of the guide portion of the bearing cage more efficiently e.g. ultimately to the pilot surface of the bearing cage.

The guide portion of the inner surface is preferably tapered in the axial direction of the bore, and preferably from each end of the bore, such that the dimensions of the bore increase towards a central region of the bore. Thus, lubricant can be guided from each end of the bore towards the working contacts of the bearing assembly in which the bearing cage is incorporated in use.

The pockets are preferably arranged sequentially around a circumferential portion of the central region.

Each pocket preferably extends between the inner and outer surfaces.

The dimensions of the bore preferably include the diameter or radius of the bore. Thus, the diameter, or radius, of the bore preferably increases in the axial direction of the bore towards a central region of the bore.

The cage may further include a plurality of conduits providing fluidic communication between the inner surface and outer surface of the cage. In use, the conduits do not house any rolling bearing elements.

Preferably, at least one conduit is provided for each respective pocket. At least two conduits are more preferably provided for each respective pocket, the pocket being located between a pair of the at least two conduits. Preferably, the pocket is located between the pair of conduits in the axial direction of the bore.

Each conduit may provide an opening located in the guide portion of the inner surface.

Preferably, the or each guide portion is associated with a respective barrier member projecting from the inner surface towards the axis of the bore, the or each guide portion being located between its respective barrier member and the central region of the bore (with respect to the axial direction of the bore).

The outer surface, in the radial direction, of the bearing cage may be suitable for use as the pilot surface of the bearing cage.

In another aspect, the present invention also provides a bearing assembly including an outer body and an inner body coaxially aligned with respect to a rotational axis about which the outer and inner bodies are able to rotate relative to one another; a bearing cage according to the disclosure herein (in particular the aspect(s) above), wherein the bearing cage is arranged coaxially with and radially between the inner and outer bodies; and a respective rotatable rolling bearing element provided in each pocket of the cage bearing to engage rotatably with the inner and outer bodies.

The bearing cage preferably includes a pilot surface for cooperating with a pilot surface of the outer body to maintain the coaxial alignment of the outer body and bearing cage. The radial distance between the respective pilot surfaces being greater than the radial distance between the inner body and the bearing cage, for example between the inner body and the inner surface of the bearing cage.

Preferably, the inner body includes lubricant dispersers on the inner surface of the bearing cage. The lubricant dispersers may be provided as under race feeds, also known as inner race (lubricant) feeds.

The present invention also provides a gas turbine engine incorporating a bearing cage as described herein, in particular as described in the aspect(s) above.

The present invention also provides a gas turbine engine incorporating a bearing assembly as described herein, in particular as described in the aspect(s) above.

The present invention includes a method of assembling a gas turbine engine, including the step of incorporating into the engine a bearing cage according to the disclosure herein, in particular according to the aspect(s) above.

The present invention includes a method of assembling a gas turbine engine, including the step of incorporating into the engine a bearing assembly according to the disclosure herein, in particular according to the aspect(s) above.

The taper of the or each bore may be a linear taper, such that the taper forms a constant angle with the axis of the bore.

Alternatively, the taper may be a non-linear taper, such that the angle of the taper (relative to the axis of the bore) proximate to the central region of the bore is less than the angle of taper (relative to the axis of the bore) distal to the central region of bore. Thus, lubricant is more efficiently (e.g. more quickly) guided by the taper from a region distal to the central region of the bore to a region relatively more proximate to the central region of the bore.

According to the present invention, an increase in oil catch efficiency of the bearing cage is achievable, improving (in use) the lubrication to the overall bearing assembly; and meaning that the lubricant system for the entire arrangement in which the bearing cage is incorporated can be optimized.

The improved lubrication improves the robustness of the overall bearing assembly, and increases the reliability of the bearing assembly under normal operating conditions.

So that the invention may be more readily understood, and so that further features thereof may be appreciated, embodiments of the invention will now be described by way of example with reference to the accompanying drawings in which.

DETAILED DESCRIPTION AND FURTHER OPTIONAL FEATURES OF THE INVENTION

Figure 1:
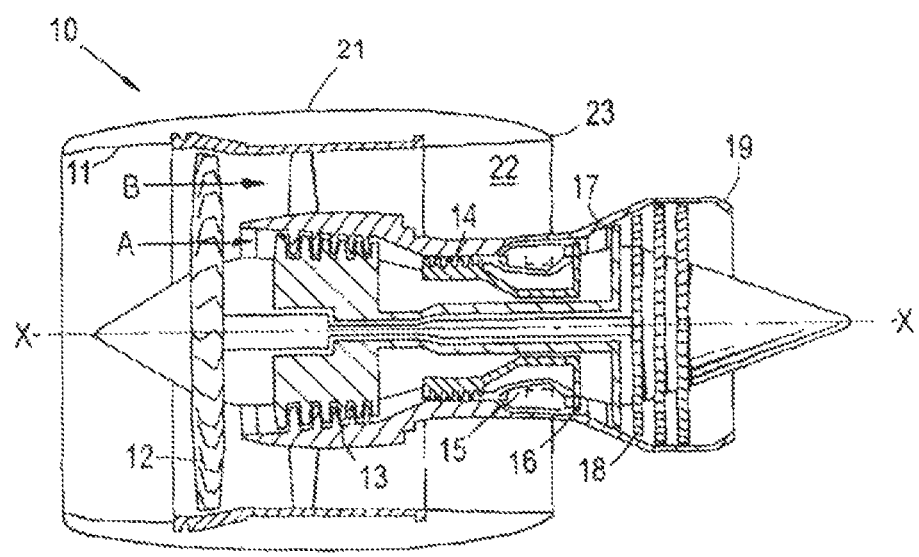
FIG. 1 shows a ducted fan gas turbine engine incorporating the present invention.
Figure 2:
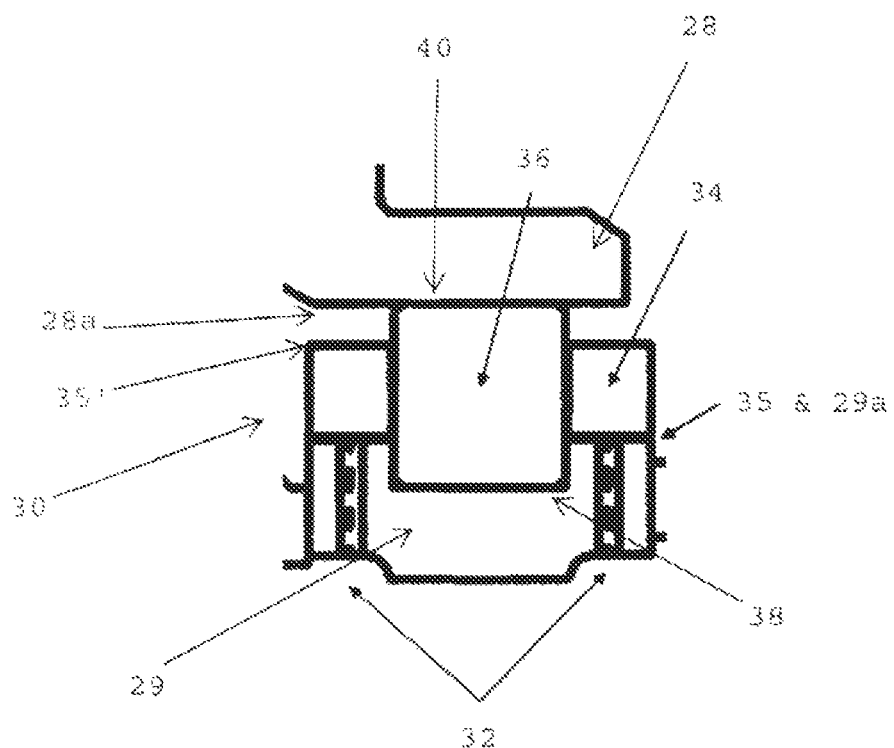
FIG. 2 shows a simplified arrangement of a prior art roller bearing with under race oil feed and an inner piloted cage.

The present invention is particularly suited to being used with a gas turbine engine drive shaft arrangement. With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 3:
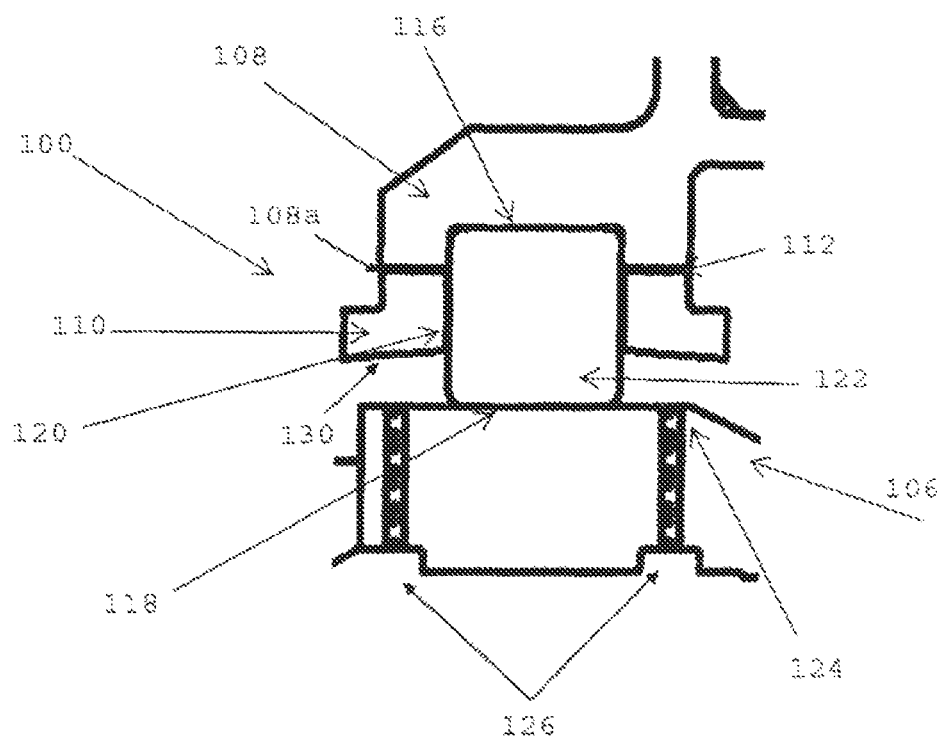
FIG. 3 shows a roller bearing with under race lubricant feed and an outer piloted cage according to an aspect of the present invention.

FIG. 3 shows a view of an assembly 100 incorporating a bearing cage 110 according to an aspect of the present invention. The view is a cross-sectional view, parallel to the axis of rotation of the bearing cage, and only shows an upper portion of the assembly.

Figure 5:
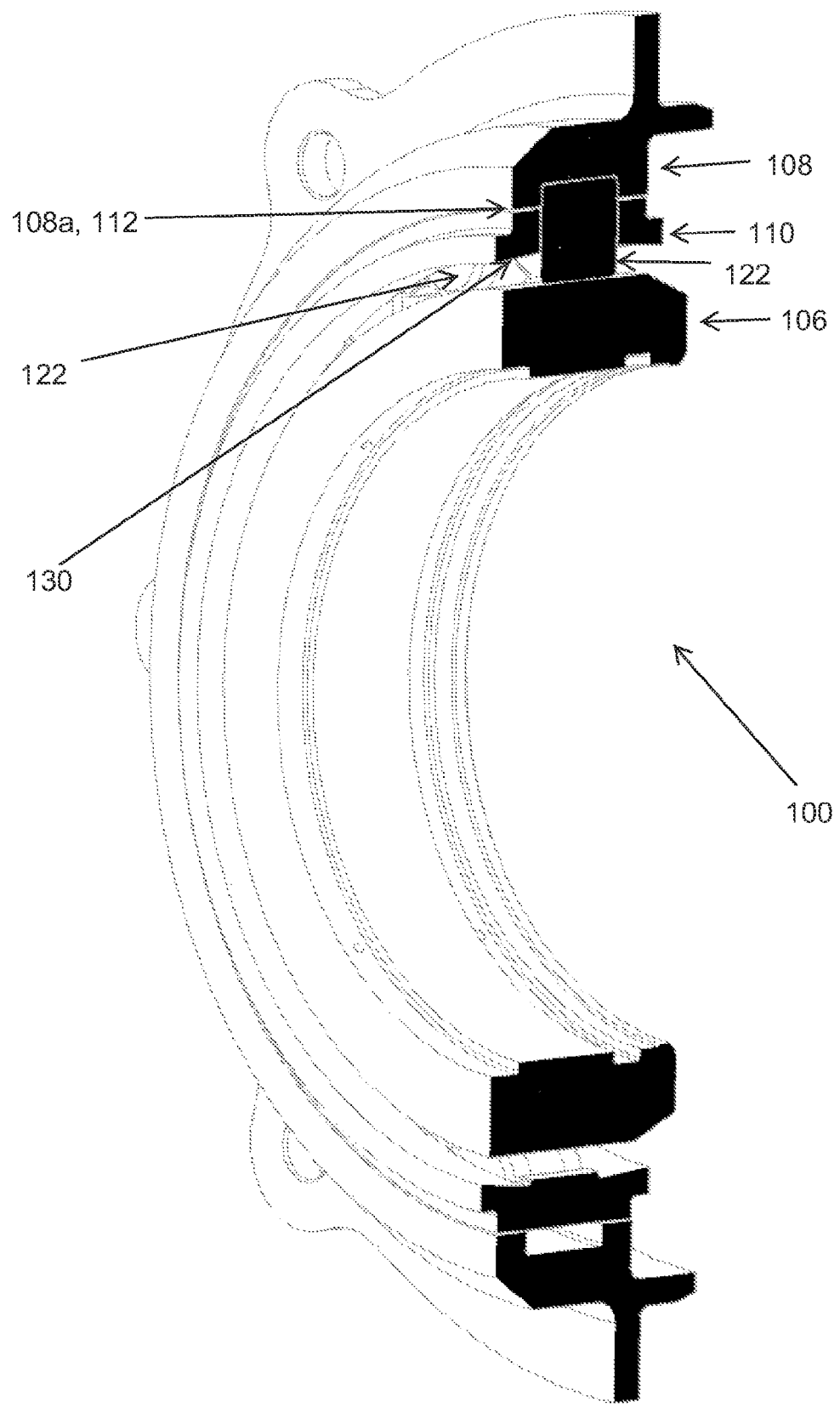
FIG. 5 shows a sectional view of an entire rolling bearing assembly including a bearing cage according to the present invention.

A sectional view of a complete bearing assembly is provided in FIG. 5.

The assembly 100 includes an inner body 106, e.g. an inner ring, and an outer body 108, e.g. an outer ring. The inner body and outer body are rotatable relative to one another about the principal axis of the assembly. In a drive shaft arrangement, the outer body 108 may be fixed and the inner body may be coupled to a drive shaft so as to be rotatable relative to the outer body, about the principal axis of the assembly.

Bearing cage 110 is arranged such that its own principal axis of rotation is coaxial with the principal axis of the assembly, and thus with both the inner and outer bodies 106 and 108. Thus, bearing cage 110 is rotatable about the principal axis of the assembly.

The principal axis of the assembly is typically coaxial with the principal and rotational axis X-X discussed above and shown in FIG. 1.

Bearing cage 110 includes an outer surface defining a cage pilot surface 112 for cooperation with a pilot surface 108a defined by an inner surface region of outer body 108. The pilot surfaces cooperate to maintain the bearing cage 110 and outer body and/or inner body in coaxial alignment with the principal axis of the assembly. Pilot surfaces typically form a pilot interface, which requires lubrication. Thus, the bearing cage can be referred to as an outer piloted bearing cage.

Bearing cage 110 includes pockets 120 shaped to retain rolling bearing elements 122. Rolling bearing elements 122 may be ball bearings or rollers, for example rollers having a cylindrical outer surface, e.g. as shown in cross-section in FIG. 3. Each rolling bearing element 122 is typically independently, rotatable about its own respective axis of rotation, which in use is typically parallel to but radially offset from the principal axis of the assembly.

Pockets 120 are arranged sequentially around the circumference of the bearing cage 110, typically to provide an equally spaced circular array of pockets centred on the principal axis of the assembly 100. Each pocket 120 is configured to house, and preferably retain, a respective rolling bearing element 122.

An inner surface region of the outer body 108 typically defines an outer raceway 116, e.g. around the inner circumference of the outer body 108, for engagement with the rolling bearing elements 122. Outer raceway 116 may be shaped to guide the rolling elements 122 around the inner circumference of the outer body 108 along a predetermined path, typically a circular path centred on the principal axis of the assembly.

An outer surface region of the inner body 106 may define an inner raceway 118, e.g. around the outer circumference of the inner body 106, for engagement with the rolling bearing elements 122. Inner raceway 118 may be shaped to guide the rolling elements 122 around the outer circumference of the inner body 106 along a predetermined path, typically a circular path centred on the principal axis of the assembly.

The load generated by the assembly 100, or a proportion thereof, is borne at the interfaces formed between the rolling bearing elements and the respective raceways. For example, rotation of the inner body 106 will generate centrifugal forces borne at said interfaces.

In addition to rotation of each rolling bearing element about its own axis of rotation, rotation of the bearing cage 110 causes movement of the rolling bearing elements about the axis of rotation of the bearing cage, e.g. to follow the path(s) defined by the raceway(s) about the principal axis of the bearing assembly.

Rotation of the bearing cage may be effected by rotation of inner body 106 and/or relative rotation of outer body 108 which results in the rolling elements being urged to move around the principal axis of the bearing assembly.

Assembly 100 requires lubrication to operate reliably. The lubricant may be a natural or synthetic oil. Thus, inner body 106 includes lubricant feeders 126, e.g. in the form of an under race oil feed (which is known in the art). To illustrate this figuratively, FIG. 3 shows droplets of lubricant progressing along feeders 126.

Lubricant from feeders 126 is able to lubricate the interface between the rolling bearing elements 122 and the inner raceway 118 by dispersing itself over the outer surface of inner body 106, including inner raceway 118. Feeders 126 provide a duct to transport lubricant, e.g. oil, from a lubricant source to openings 124 formed in the outer surface of inner body 106.

Furthermore, lubricant is communicated, e.g. sprayed, dispersed or distributed, from the surface of inner body 106 and/or from lubricant feeders 126 themselves (e.g. via openings, nozzles or apertures 124) to be caught by the inner surface 130 of cage 110. For example, inner body 106 may be a portion of, or may be rigidly attached to, a drive shaft of e.g. a gas turbine engine rotating at high speed. Centrifugal forces can therefore be employed to disperse the lubricant from the inner body 106 to the inner surface 130 of the bearing cage 110.

The inner surface 130 of bearing cage 110 defines a bore. The bore extends throughout the entire length of the bearing cage 110, along a long axis. The (long) axis of the bore is arranged coaxially with the principal axis of the assembly in use.

The bore is typically formed such that there is a significant clearance between the inner surface 130 and the outer surface of the inner body 106, for example such that the inner surface of the bearing cage does not cooperate with the outer surface of the inner body 106 to maintain the bearing cage 110 and the inner body 106 in a coaxial arrangement. Therefore, in this arrangement, the inner surface 130 of the bearing cage 110 is not a pilot surface, and the bearing cage is not referred to as an inner piloted bearing cage.

Rather, the inner surface of the bearing cage 110 is tapered in the direction of the long axis of the bore (i.e. in the direction of the principal axis of the assembly, in use). Thus, a tapered bore is formed. The taper is formed in the direction of the long axis of the bore towards a central region of the bore.

Preferably, a taper is formed from each end of the bore towards a central region of the bore, as is shown in FIG. 3. Therefore, the bore may be provided in the form of a pair of opposing tapered (sub) bores, formed in the axial direction of the bore. In other words, the radius of the bore may increase in the axial direction of the bore towards a central region of the bore, from each end of the bore.

Thus, gravity and/or the centrifugal forces associated with high speed rotation of the cage 110 result in the lubricant on the inner surface 130 being guided towards the central region of the bore by the taper.

Typically, the pockets are arranged circumferentially around the central region of the bore. Thus, the lubricant is guided towards the pockets and the rolling bearing elements located in the pockets. In essence, each taper promotes lubricant to be fed towards the pockets, and thus the rolling bearing elements 122, rather than away from them.

The angle of the taper relative to the axis of the bore may be greater than zero up to approximately fifty degrees, and still direct lubricant towards the central region of the bore. The greater the angle of taper, the more efficient the cage will be at directing lubricant towards the central region of the bearing assembly, and thus towards the working contacts of the bearing.

In practice, the limits of the angle of the taper are determined by the minimum thickness of the cage to retain structural integrity and the running clearance to the inner raceway. These limits tend to restrict taper angles above fifty degrees. However, if the architecture surrounding the bearing cage permits it, then an angle above fifty degrees could be used. The angle of the taper could be optimised through the use of a computational fluid dynamics simulation. In preferred examples, the taper is less than 40°, less than 30°, less than 25°, less than 20°, less than 15°, less than 10° or less than 5°. Most preferably, the taper is less than 20°.

Lubricant passing through the pockets typically lubricates not only the rolling bearing elements 122 and their contact areas with the respective raceways, but also the respective pilot surfaces 108a and 112 (and their contact areas). These contact areas can thus be referred to as the "working contacts" of the bearing.

Figure 4:
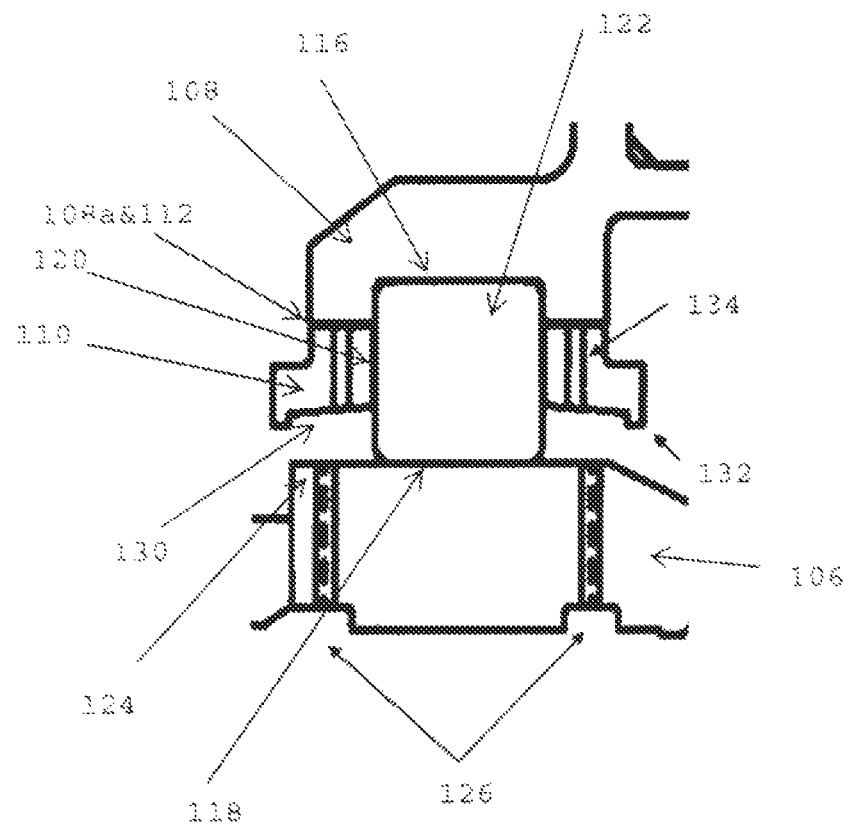
FIG. 4 shows a roller bearing with under race lubricant feed and an outer piloted cage according to another aspect of the present invention.

Another embodiment of a bearing cage 110 is shown in FIG. 4. As discussed below, two additional, optional, features are included in the bearing cage 110 according to this embodiment: one or more barrier members 132 and one or more conduits 134.

However, although these features may be combined in a single embodiment to provide an improved bearing cage, for example similar to that shown in FIG. 4, they are independent features, and each could be provided in a bearing cage 110 without the other.

A bearing cage 110 according to the embodiment shown in FIG. 4 typically includes one or more barrier members. A barrier member 132 is a member which projects from the bearing cage 110, preferably from the inner surface 130, towards the bore axis. The barrier members 132 act as a barrier to help prevent lubricant on the inner surface 130 of the bearing cage 110 from dispersing in a direction away from the central region of the bore, and thereby promoting the lubricant to disperse in the direction of the central region of the bore. The barrier member(s) 132 provide a physical barrier to block progression of lubricant along the inner surface 130, in the axial direction of the bore, away from the central region of the bore.

A respective barrier member may be provided for each taper. Preferably, the or each barrier member is arranged so that its respective taper is located between the barrier member and the central region of the bore. In other words, the or each barrier member is preferably located axially outwards from the central region of the bore and from its respective taper. For example, each tapered bore may be located (in the axial direction of the bore) between a barrier member and the central region of the bearing cage 110.

The barrier member may be formed as a radially inwardly projecting lip at the edge of the bore, e.g. at each end of the bore. Preferably, the lip extends radially inwardly of the inner surface of the cage sufficiently to ensure the volume of oil entrained in the bore of the bearing cage does not flow over the lip. The actual size of the lip (i.e. the extent of radial projection) will vary depending on the size of the bearing assembly, the volume of oil fed to the bearing assembly and the taper angle of the bearing cage bore.

If an increased lubricant flow to the cage piloting diameter is required, for example relative to the oil flow to the rolling bearing elements, then a number of lubricant holes or conduits could be added through the bearing cage to provide a direct lubricant feed to the pilot surfaces, i.e. to the pilot interface formed between the respective pilot surfaces of the bearing cage and the outer body.

The size and number of these holes is dependent on the required level of lubricant flow to pass directly to the cage pilot lands. This can be calculated using standard fluid dynamics theory. The size and number of the oil holes would be restricted by the size of the cage to ensure that structural integrity of the cage is maintained.

Therefore, another feature of the present invention shown in the embodiment described by FIG. 4 is the one or more conduits 134, putting the inner and outer surfaces of the bearing cage 110 in fluid communication with one another. Lubricant on inner surface 130 of the bearing cage 110 is able to pass along each conduit 134 in order to arrive at the outer surface of the bearing cage 110, and thereby lubricate the cage pilot surface 108a and/or the pilot surface of the outer body 108.

The conduits may be arranged to extend radially with respect to the axis of the bore, and thus with respect to the principal axis of the assembly.

Preferably, a respective set of conduits is provided for each pocket 120. Each set of conduits 134 may include a first pair of conduits, the respective pocket preferably being located between the first pair of conduits in the axial direction of the bore of the bearing cage 110.

Preferably, each pocket is provided with a respective conduit which includes an opening on the inner surface of bearing cage 110 located in a region of the inner surface partly defining a tapered region of the bore. In other words, preferably, conduits are provided having an opening (or aperture) located in the region of taper of the bore, e.g. in the guide region of the bore.

Preferably, where the bearing cage bore includes a pair of axially opposed tapered (sub) bores, each pocket is provided with a respective set of conduits including a pair of conduits, each conduit of the pair having an opening formed in a respective region of the inner surface of the cage bearing 110, each of these respective regions of the inner surface of the cage bearing 110 partly defining a respective tapered (sub) bore of the bearing cage bore.

Where a conduit 134 is provided in a bearing cage 110 together with a barrier member 132, preferably the conduit is located between a pocket 120 formed in the bearing cage 110 and the barrier member, with respect to the axial direction of the bore. The conduit is typically greater than 1 mm in diameter, and is typically chosen to ensure a reliable flow of lubricant.

Preferably, the long axis of the or each conduit is formed to extend substantially orthogonally to the long axis of the bore of the bearing cage 110. In other words, the long axis of the or each conduit is preferably parallel to a radius of the bore of the bearing cage 110.

Preferably, for each conduit, the opening or aperture formed in the inner surface of bearing cage 110 is offset, in the axial direction of the bore and/or circumferentially around the bore, with respect to the location of openings 124 of lubricant (oil) feeders 126.

In any embodiment or aspect, the axial length of the bearing cage 110 may exceed that of the inner body 106 and/or outer body 108 in either or both axial directions.

Preferably, each lubricant (oil) feed opening 124 provided by the inner body is located within the bore, and thus the cage bearing extends in the axial direction beyond the lubricant (oil) feed openings. The extent to which the cage bearing extends in the axial direction beyond the lubricant (oil) feed openings 124 will depend on the relative axial movement between the inner body 106 and outer body 108, and thus between the inner body 106 and outer body 108, because axial movement of the outer body 108 typically results in a corresponding axial movement of bearing cage 110.

It is also to be understood that, although the term bore has been used herein, methods other than boring could be used to form the bore, for example, machining other than boring, moulding, casting, etching, laser cutting, etc. could be used to form a bearing cage having an inner surface defining a bore. The term lumen could be used in place of bore.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A bearing cage for a rolling element bearing assembly, the bearing cage including
    an outer surface;
    an inner surface defining a bore; and
    a plurality of pockets, each pocket of the plurality of pockets being configured to house a rolling element of the rolling element bearing assembly, the plurality of pockets being arranged sequentially around the bearing cage with respect to an axis of the bore, wherein
    a guide portion of the inner surface is tapered in an axial direction of the bore such that dimensions of the bore increase towards a central region of the bore, and
    the bearing cage further includes a plurality of conduits providing fluidic communication between the inner surface of the bearing cage and the outer surface of the bearing cage.

2. The bearing cage for a rolling element bearing assembly according to claim 1 wherein the guide portion of the inner surface is tapered in the axial direction of the bore, and from each end of the bore, such that the dimensions of the bore increase towards a central region of the bore.

3. The bearing cage for a rolling element bearing assembly according to claim 1 wherein the plurality of pockets are arranged around a circumferential portion of the central region.

4. The bearing cage for a rolling element bearing assembly according to claim 1, wherein each pocket of plurality of pockets extends fully between the inner surface and the outer surface of the bearing cage.

5. The bearing cage for a rolling element bearing assembly according to claim 1, wherein the dimensions of the bore include a diameter or a radius of the bore.

6. The bearing cage for a rolling element bearing assembly according to claim 1, wherein, in use, the conduits do not house any of the rolling elements.

7. The bearing cage for a rolling element bearing assembly according to claim 1, wherein at least one conduit is provided for each respective pocket.

8. The bearing cage for a rolling element bearing assembly according to claim 1, wherein at least two conduits are provided for each respective pocket, each respective pocket being located between a pair of the at least two conduits.

9. The bearing cage for a rolling element bearing assembly according to claim 1 wherein a plurality of the conduits are provided in the guide portion of the inner surface.

10. The bearing cage for a rolling element bearing assembly according to claim 1, wherein the or each guide portion is associated with a respective barrier member projecting from the inner surface towards the axis of the bore, the or each guide portion being located between the central region of the bore and its respective barrier member.

11. The bearing cage for a rolling element bearing assembly according to claim 1 wherein an angle of the taper of the bore, relative to the axis of the bore, is less than 20°.

12. The bearing cage for a rolling element bearing assembly according to claim 1, wherein the outer surface, in a radial direction, of the bearing cage is configured to be the pilot surface of the bearing cage.

13. A bearing assembly including
    an outer body and an inner body coaxially aligned with respect to a rotational axis about which the outer body and the inner body are able to rotate relative to one another,
    a bearing cage including
        an outer surface;
        an inner surface defining a bore;
        a plurality of pockets, each pocket of the plurality of pockets being configured to house a rolling element of the rolling element bearing assembly, the plurality of pockets being arranged sequentially around the bearing cage with respect to an axis of the bore; wherein a guide portion of the inner surface is tapered in an axial direction of the bore such that dimensions of the bore increase towards a central region of the bore, the bearing cage being arranged coaxially with and radially between the inner body and the outer body, and
    a respective rotatable rolling bearing element provided in each pocket of the plurality of pockets of the cage bearing to engage rotatably with the inner body and the outer body,
    wherein the bearing cage further includes a plurality of conduits providing fluidic communication between the inner surface of the bearing cage and the outer surface of the bearing cage.

14. The bearing assembly according to claim 13 wherein the bearing cage includes a pilot surface for cooperating with a pilot surface of the outer body to maintain the coaxial alignment of the outer body and the bearing cage.

15. A gas turbine engine incorporating a bearing cage for a rolling element bearing assembly, the bearing cage including
    an outer surface;
    an inner surface defining a bore; and
    a plurality of pockets, each pocket of the plurality of pockets being configured to house a rolling element of the rolling element bearing assembly, the plurality of pockets being arranged sequentially around the bearing cage with respect to an axis of the bore, wherein a guide portion of the inner surface is tapered in an axial direction of the bore such that dimensions of the bore increase towards a central region of the bore, and the bearing cage further includes a plurality of conduits providing fluidic communication between the inner surface of the bearing cage and the outer surface of bearing cage.

* * * * *